(12) United States Patent
Kuribayashi et al.

(10) Patent No.: US 9,170,537 B2
(45) Date of Patent: Oct. 27, 2015

(54) FUSER AND IMAGE FORMING APPARATUS

(71) Applicant: KONICA MINOLTA, INC., Chiyoda-ku (JP)

(72) Inventors: Yoshikazu Kuribayashi, Okazaki (JP); Hidetoshi Katayanagi, Nakano-ku (JP); Etsuaki Urano, Okazaki (JP); Hirotaka Kanou, Toyokawa (JP); Masashi Sonoyama, Toyokawa (JP); Tomohiro Takagi, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/607,364

(22) Filed: Jan. 28, 2015

(65) Prior Publication Data

US 2015/0220031 A1    Aug. 6, 2015

(30) Foreign Application Priority Data

Feb. 6, 2014 (JP) ................................ 2014-021550

(51) Int. Cl.
*G03G 15/20* (2006.01)
*F16H 7/18* (2006.01)

(52) U.S. Cl.
CPC .............. *G03G 15/2089* (2013.01); *F16H 7/18* (2013.01); *G03G 15/2032* (2013.01); *G03G 15/2053* (2013.01)

(58) Field of Classification Search
CPC .......... G03G 15/2032; G03G 15/2067; G03G 15/2089
See application file for complete search history.

(56) References Cited

U.S. PATENT DOCUMENTS

| 5,247,336 | A  | * | 9/1993  | Mills, III ........................ 399/70 |
| 6,865,364 | B2 | * | 3/2005  | Matsumoto .................. 399/329 |
| 8,195,067 | B2 | * | 6/2012  | Sasaki et al. ................. 399/122 |
| 8,565,658 | B2 | * | 10/2013 | Tsukioka ..................... 399/328 |
| 2007/0217839 | A1 | * | 9/2007 | Moteki et al. ................ 399/329 |

FOREIGN PATENT DOCUMENTS

JP    2009-109673 A    5/2009
JP    2013125071 A  *  6/2013

* cited by examiner

*Primary Examiner* — Clayton E LaBalle
*Assistant Examiner* — Leon W Rhodes, Jr.
(74) *Attorney, Agent, or Firm* — Buchanan Ingersoll & Rooney PC

(57) ABSTRACT

A fuser for fixing an unfixed toner image on a recording material includes: an endless belt body heated by a heat source; a pressing body moved to be connected to and disconnected from an inner peripheral surface of the belt body; a pressure roller member making pressure-contact with the pressing body through the belt body; a tension body moved to be connected to and disconnected from the inner peripheral surface of the belt body, contrary to the connection and disconnection movement of the pressing body; and a rotation transmitting unit configured to transmit a rotational force of the pressure roller member to the belt body using the tension body, while the pressing body is separated from and the tension body makes contact with the inner peripheral surface of the belt body.

9 Claims, 15 Drawing Sheets

FUSER AND IMAGE FORMING APPARATUS

The entire disclosure of Japanese Patent Application No. 2014-021550 filed on Feb. 6, 2014 including description, claims, drawings, and abstract are incorporated herein by reference in its entirety.

BACKGROUND OF THE INVENTION

1. Field of the Invention

The present invention relates to a fuser configured to fix an unfixed toner image on a recording material, and an image forming apparatus including the fuser. The image forming apparatus variously includes a copying machine, a printer, a facsimile machine, and a multifunction printer having integrated their functions.

2. Description of the Related Art

In recent years, an electrophotographic image forming apparatus is expected to reduce a warm-up time (a time required for copying or printing from turning on power) or reduce power consumption, from a viewpoint of energy saving. To satisfy such a requirement, a fusing belt or fusing roller to be heated has been configured to have a small heat capacity, or to have small heat loss as much as possible.

For example, JP 2009-109673 A discloses a fuser configure to completely separate the fusing belt from the pressure roller during warming up, in order to prevent excessive heat loss of the fusing belt by a pressure roller. In the fuser of JP 2009-109673 A, a pressure roller is rotated by power from a driving source. A fusing belt-driving roller receiving transmission of a rotational force of the pressure roller is brought into pressure-contact with an outer peripheral surface of a sheet non-passage area on each longitudinal end side of the fusing belt. during warming up where the fusing belt and the pressure roller is separated from each other, the rotational force of the pressure roller is transmitted to the fusing belt-driving roller, and the fusing belt is driven to be rotated by frictional resistance with the fusing belt-driving roller. During passage of sheet, the fusing belt and the pressure roller are brought into pressure-contact with each other to form a fusing nip, so that the fusing belt is driven to be rotated by frictional resistance between the pressure roller (including a recording material passing through the fusing nip) and the fusing belt-driving roller to the fusing belt. That is, the fusing belt is driven to be rotated, and is heated along the circumferential direction (rotational direction) from a heat source. It is noted that the fusing belt has an inner peripheral surface disposed with a pressing pad making pressure-contact with the pressure roller through the fusing belt.

A fusing belt or a fusing roller needs to be heated uniformly along the circumferential direction (rotational direction), from a viewpoint of fusibility. However, in the fuser of JP 2009-109673 A, even while the fusing belt and the pressure roller are separated from each other, the pressing pad always makes pressure-contact with the inner peripheral surface of the fusing belt in the sheet passage area, and the fusing belt-driving roller always makes pressure-contact with the outer peripheral surface of the fusing belt in the sheet non-passage area, so that heat of the fusing belt is partially lost by the pressing pad and the fusing belt-driving roller.

When the fuser is configured as described above, heat loss by the pressure roller is inhibited, but efficient temperature rise may be deteriorated as much as heat loss by the pressing pad and the fusing belt-driving roller, the warm-up time or the first copy output time (FCOT) maybe increased, and power consumption may be increased.

Further, as described above, the pressing pad always makes pressure-contact with the inner peripheral surface of the fusing belt in the sheet passage area, and the fusing belt-driving roller always makes pressure-contact with the outer peripheral surface of the fusing belt in the sheet non-passage area, thereby the fusing belt wears easily, and the fusing belt is expected to be improved also in durability.

SUMMARY OF THE INVENTION

The present invention has been made in view of the above problem and a technical object thereof is to provide a fuser configured to reduce the warm-up time or the first copy output time (FCOT), reduce power consumption, and improve the durability of and increase the life of the fusing belt, and an image forming apparatus including the fuser.

To achieve the abovementioned object, according to an aspect, a fuser for fixing an unfixed toner image on a recording material, reflecting one aspect of the present invention comprises an endless belt body, a pressing body, a pressure roller member, a tension body, and a rotation transmitting unit. The endless belt body is heated by a heat source. The pressing body is moved to be connected to and disconnected from an inner peripheral surface of the belt body. The pressure roller member makes pressure-contact with the pressing body through the belt body. The tension body is moved to be connected to and disconnected from the inner peripheral surface of the belt body, contrary to the connection and disconnection movement of the pressing body. The rotation transmitting unit transmits a rotational force of the pressure roller member to the belt body using the tension body, while the pressing body is separated from and the tension body makes contact with the inner peripheral surface of the belt body.

According to the invention of Item. 2, in the fuser of Item. 1, the rotation transmitting unit is preferably an auxiliary power transmission belt wound around the pressure roller member and the tension body.

According to the invention of Item. 3, in the fuser of Item. 1, the rotation transmitting unit is preferably employed to hold the belt body between the pressure roller member and the tension body, while the pressing body is separated from the inner peripheral surface of the belt body.

According to the invention of Item. 4, in the fuser of any one of Items. 1 to 3, the tension body is preferably disposed on an inner peripheral side of a sheet non-passage area on either longitudinal end side of the belt body.

According to the invention of Item. 5, in the fuser of any one of Items. 1 to 4, the tension body preferably has a hardness set lower than the hardness of the belt body.

According to the invention of Item. 6, in the fuser of Item. 3, the fuser preferably includes a large diameter elastic portion having a diameter larger than a sheet passage area, and flattened and deformed by pressure-contact of the belt body, in a sheet non-passage area on either longitudinal end side of the pressure roller member, in which the tension body is preferably disposed on an inner peripheral side of the sheet non-passage area on either longitudinal end side of the belt body, and the belt body is preferably held between the large diameter elastic portion and the tension body while the pressing body is separated from the inner peripheral surface of the belt body.

According to the invention of Item. 7, in the fuser of any one of Items. 1 to 6, the belt body preferably includes a magnetic metal layer, and the heat source is preferably an induction heating member configured to heat the magnetic metal layer of the belt body by electromagnetic induction effect.

According to the invention of Item. 8, in the fuser of Item. 1, the tension body preferably makes contact with the inner peripheral surface of the belt body, supports the belt body without contact with the pressing body and the pressure roller member, and rotates itself in association with the rotation of the pressure roller member to transmit the rotational force of the pressure roller member to the belt body.

According to the invention of Item. 9, an image forming apparatus preferably includes the fuser of any one of Items. 1 to 8.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
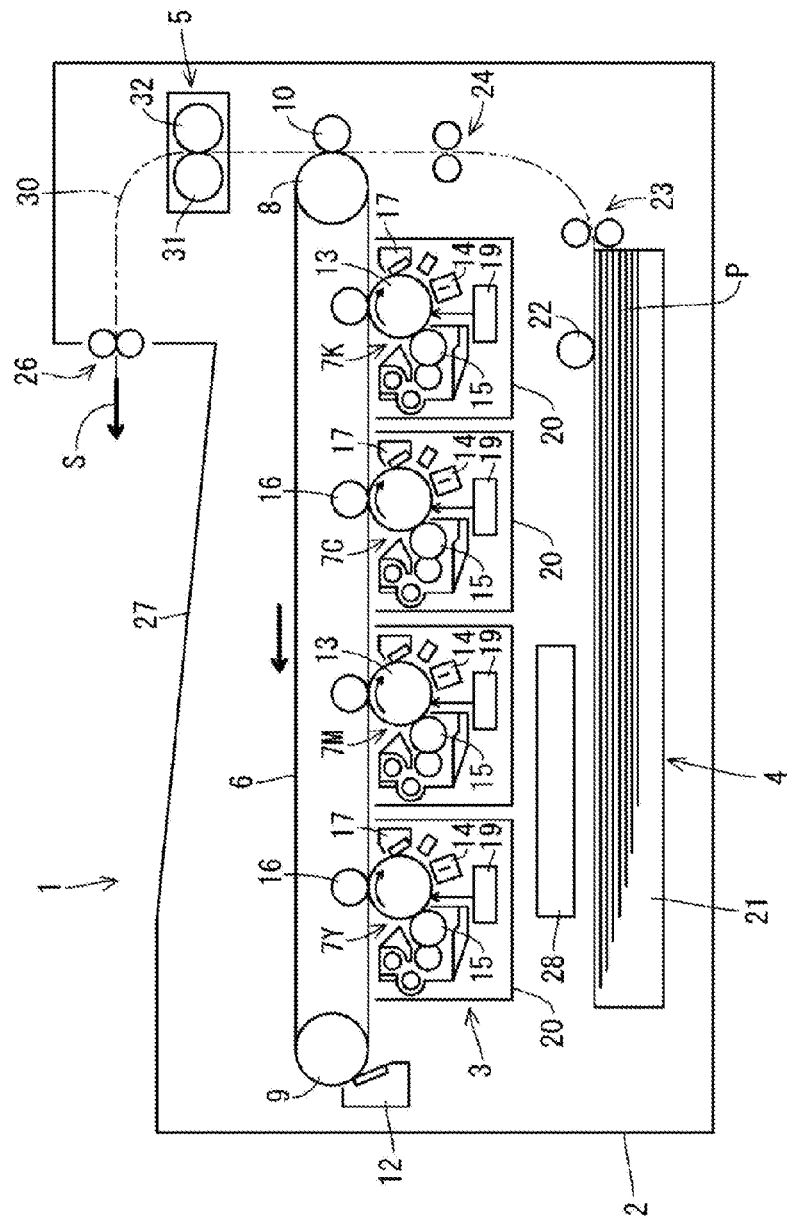
FIG. 1 is a schematic explanatory diagram illustrating a printer.

Examples of the present invention will be described below based on the drawings illustrating the application of a tandem color digital printer (hereinafter, referred to as a printer) as one example of an image forming apparatus. It is noted that, in the following description, terms each indicate a specific direction or position (e.g., "right and left" or "upper and lower"), and when the terms are used as necessary, the planar direction of the drawing of FIG. 1 is defined as the front view, as a reference. The terms are used for convenience of description, and are not intended to limit the technical scope of the present invention.

(1) Summary of Printer

First, a summary of the printer 1 will be described with reference to FIG. 1. As illustrated in FIG. 1, the printer 1 includes a casing 2, and further includes an image processor 3, a paper feeder 4, a fuser 5, and the like in the casing 2. Although detailed illustration is not made in FIG. 1, the printer 1 is connected to a network such as a LAN to perform printing based on a print command from an external terminal (illustration is omitted) upon receiving the command.

A paper feeder 4 positioned at the lower part in the casing 2 includes a paper feed cassette 21, a pickup roller 22, a pair of separation rollers 23, and a pair of timing rollers 24, and the like. The paper feed cassette 21 houses recording materials P. The pickup roller 22 feeds the recording materials P in the paper feed cassette 21 from an uppermost layer. The pair of separation rollers 23 separates the fed recording materials P one by one. The pair of timing rollers 24 conveys the separated one recording material P to the image processor 3 with predetermined timing. The recording materials P in the paper feed cassette 21 are fed out one by one from an uppermost layer to a conveying path 30 by the rotation of the pickup roller 22 and the separation rollers 23. The conveying path 30 extends from the paper feed cassette 21 of the paper feeder 4 to an exit roller pair 26 at an upper part of the casing 2, through a nip between the timing roller 24 pair, a secondary transfer nip of the image processor 3, and a fusing nip 33 of the fuser 5.

The recording materials P in the paper feed cassette 21 are set relative to the center for conveyance to the conveying path 30 in a conveying direction S, based on the center of a sheet passage width (a width dimension perpendicular to the conveying direction S). Although illustration is omitted, the paper feed cassette 21 internally includes a pair of side regulation plates configured to align, relative to the center, the width of the recording materials P before feeding. The pair of side regulation plates are moved in association with each other to access and separate from each other in a direction of sheet passage width. The recording materials P in the paper feed cassette 21 are held between the pair of side regulation plates from both sides in a direction of sheet passage width, and the recording materials P in the paper feed cassette 21 are set relative to the center regardless of their specification. Accordingly, transfer processing at the image processor 3 or fusing processing at the fuser 5 is also performed relative to the center.

The image processor 3 positioned above the paper feeder 4 transfers a toner image formed on a photoreceptor drum 13 as one example of an image carrier, to the recording material P. The image processor 3 includes an intermediate transfer belt 6 as an intermediate transfer body, four imaging units 7 corresponding to colors of yellow (Y), magenta (M), cyan (C), and black (K), and the like.

The intermediate transfer belt 6 includes an electrically conductive material, has an endless form, and is also one example of the image carrier. In the casing 2, the intermediate transfer belt 6 is wound around a driving roller 8 positioned on the right side of the center, and a driven roller 9 positioned on the left side of the center. A secondary transfer roller 10 is disposed on the outside of a portion of the intermediate transfer belt 6 wound around the driving roller 8. Power of a main motor (illustration is omitted) is transmitted to rotate the driving roller 8 counterclockwise according to FIG. 1, and the intermediate transfer belt 6 rotates counterclockwise according to FIG. 1.

On the outer peripheral side of the portion of the intermediate transfer belt 6 wound around the driving roller 8, the secondary transfer roller 10 is disposed. The secondary transfer roller 10 abuts on the intermediate transfer belt 6, and a portion (abutment portion) between the intermediate transfer belt 6 and the secondary transfer roller 10 is formed to be a secondary transfer nip as a secondary transfer region. The secondary transfer roller 10 is rotated clockwise according to FIG. 1, with the rotation of the intermediate transfer belt 6 or with the movement of the recording material P held and conveyed through the secondary transfer nip. On the outer peripheral side of a portion of the intermediate transfer belt 6 wound around the driven roller 9, a transfer belt cleaner 12 is disposed for removing untransferred toner on the intermediate transfer belt 6. The transfer belt cleaner 12 abuts on the intermediate transfer belt 6.

The four imaging units 7 are arranged under the intermediate transfer belt 6, in the order of yellow (Y), magenta (M), cyan (C), and black (K), from the left side according to FIG. 1, along the intermediate transfer belt 6. In FIG. 1, for convenience of description, the imaging units 7 are denoted by reference signs Y, M, C, and K, respectively, according to reproduced colors. Each of the imaging units 7 includes a photoreceptor drum 13, as one example of the image carrier rotated clockwise according to FIG. 1. Around the photoreceptor drum 13, a charging device 14, an exposure device 19, a developing device 15, a primary transfer roller 16, and a photoreceptor cleaner 17 are sequentially disposed along a clockwise rotational direction according to FIG. 1.

The photoreceptor drum 13 has a negative chargeability, and is rotated clockwise according to FIG. 1, by the power transmitted from the main motor. The charging device 14 uniformly charges the surface of the photoreceptor drum. The developing device 15 uses toner having negative polarity to expose an electrostatic latent image formed on the photoreceptor drum 13 by reversal development.

The primary transfer roller 16 is positioned on the inner peripheral side of the intermediate transfer belt 6, and faces the photoreceptor drum 13 of the corresponding imaging unit 7 across the intermediate transfer belt 6. The primary transfer roller 16 is also rotated counterclockwise according to FIG. 1, with the rotation of the intermediate transfer belt 6. A portion between the intermediate transfer belt 6 and the primary transfer roller 16 (abutment portion) is formed to be a primary transfer nip as a primary transfer region. The photoreceptor cleaner 17 is used for removing the untransferred toner remaining on the photoreceptor drum 13, and abuts on the photoreceptor drum 13. Under each of the four imaging units 7, the exposure device 19 is disposed. The exposure device 19 forms an electrostatic latent image on each photoreceptor drum 13 using laser light based on image information from the external terminal or the like.

Each imaging unit 7 integrally houses the photoreceptor drum 13, the charging device 14, the exposure device 19, the developing device 15, and the photoreceptor cleaner 17 in a housing 20 to form a cartridge (integral structure), and the imaging unit 7 is mounted, as a so-called process cartridge, to the casing 2 replaceably (detachably). It is noted that, above the intermediate transfer belt 6, a hopper (illustration is omitted) is disposed which houses toner to be fed to each developing device 15.

In each imaging unit 7, when laser light corresponding to an image signal is projected to the photoreceptor drum 13 charged by the charging device 14 from the exposure device 19, the electrostatic latent image is formed. The electrostatic latent image is reversely developed with toner fed from the developing device 15 into the toner image of each color. The toner image on each photoreceptor drum 13 is superposedly transferred primarily from the photoreceptor drum 13 to the outer peripheral surface of the intermediate transfer belt 6, in the order of yellow, magenta, cyan, and black, in each corresponding primary transfer nip. The untransferred toner remaining on the photoreceptor drum 13 is scraped by the photoreceptor cleaner 17, and removed from the photoreceptor drum 13. When the recording material P passes through the secondary transfer nip, the superposed toner images of four colors are secondarily transferred collectively onto the recording material P. The untransferred toner remaining on the intermediate transfer belt 6 is scraped by the transfer belt cleaner 12, and is removed from the intermediate transfer belt 6.

The fuser 5 is positioned above the secondary transfer roller 10, and includes a fusing roller member 31, and a pressure roller member 32 making pressure-contact with the fusing roller member 31. An abutment portion between the fusing roller member 31 and the pressure roller member 32 is formed to be the fusing nip 33 as a fusing region. The recording material P having an unfixed toner image thereon, passes through the secondary transfer nip, and is heated and pressed upon passage through the fusing nip 33 between the fusing roller member 31 and the pressure roller member 32, and thereby the toner image is fixed on the recording material P. Thereafter, the recording material P is output onto a paper output tray 27 by the rotation of the exit roller pair 26.

In the casing 2, a control unit 28 is disposed between the image processor 3 and the paper feeder 4. The control unit 28 generally controls the printer 1. The control unit 28 includes a controller (illustration is omitted) configured to perform various arithmetic processing, storage, and control.

(2) Fuser According to First Embodiment and Detailed Peripheral Configuration Thereof Next, the fuser 5 according to a first embodiment and a detailed peripheral configuration thereof will be described with reference to FIGS. 2 to 7. As described above, the fuser 5 includes the fusing roller member 31, and the pressure roller member 32. The fusing roller member 31, and the pressure roller member 32 extend in a direction of sheet passage width, and are rotated in pressure-contact with each other.

The fusing roller member 31 includes a fusing roller 42 as a pressing member, and a fusing belt 43 as a belt body, positioned on the outer peripheral side of the fusing roller 42. The fusing roller 42 presses the fusing belt 43 from the inner peripheral side to form a fusing nip 33, and is formed into a cylindrical shape to be elongated in a direction of sheet passage width. The fusing belt 43 according to the first embodiment constitutes the outer peripheral portion of the fusing roller member 31, and has an endless shape. The fusing belt 43 has a cylindrical shape elongated in the direction of sheet passage width, and holds the cylindrical shape by tension of itself basically.

The fusing roller 42 includes a mandrel portion 42a elongated in a direction of sheet passage width and an elastic portion 42b fitted on the outer peripheral of the mandrel portion 42a, and is configured into a roller shape. The mandrel portion 42a has both end sides in the direction of sheet passage width. Both end sides project outward from the elastic portion 42b in the direction of sheet passage width, and penetrate a pair of side plates 35 positioned in the casing 2.

In this configuration, each side plate 35 includes an elongated hole 36 formed to be elongated in a connection/disconnection direction in which the fusing roller member 31 and the pressure roller member 32 are connected to and disconnected from each other (it can be also referred to as a direction in which the fusing roller member 31 and the pressure roller member 32 are arranged side by side). Each end of the fusing roller 42 (mandrel portion 42a) in the direction of sheet passage width is inserted into the corresponding elongated hole 36. For this reason, the fusing roller 42 can slide along the elongated holes 36 in both side plates 35. That is, the fusing roller 42 can be moved to be connected to and disconnected from an inner peripheral surface of the fusing belt 43.

The fusing roller 42 (more specifically, the elastic portion 42b) has a length, in the direction of sheet passage width, smaller than that of the fusing belt 43 in the direction of sheet passage width. While the fusing roller 42 is inserted into an inner peripheral side of the fusing belt 43, both end sides of the fusing belt 43 in the direction of sheet passage width (longitudinal direction) further extend outward in the direction of sheet passage width, from both end surfaces of the elastic portion 42b in the direction of sheet passage width. The elastic portion 42b is put on the inner peripheral side of the fusing belt 43 to be concealed therein, and both ends of the mandrel portion 42a in the direction of sheet passage width project outward from the fusing belt 43 in the direction of sheet passage width. Both end sides of the fusing belt 43 in the direction of sheet passage width are each formed into a hollow end portion 43a not overlapping the fusing roller 42 (more specifically, the elastic portion 42b). In the fusing belt 43, a portion overlapping the elastic portion 42b of the fusing roller 42 corresponds to a sheet passage area. Accordingly, both hollow end portions 43a of the fusing belt 43 are each formed as a sheet non-passage area. Additionally, also in the pressure roller member, a portion overlapping the elastic portion 42b of the fusing roller 42 corresponds to the sheet passage area, and portions overlapping both hollow end portions 43a of the fusing belt 43 are each formed as the sheet non-passage area. The fusing belt 43 according to the first embodiment is configured into a multi-layer structure. The multi-layer structure of the fusing belt 43 includes a magnetic metal layer 43b.

As one example of a heat source for heating the fusing belt 43, a heating unit 60 as an induction heating member is disposed out of contact with the fusing belt 43, on the opposite side to the pressure roller member 32 across the fusing belt 43. The heating unit 60 heats the magnetic metal layer 43b of the fusing belt 43 by electromagnetic induction. The heating unit 60 includes electromagnetic induction coils 62 and a coil housing case 63. The electromagnetic induction coils 62 face the outer peripheral surface of the fusing belt 43, and generate eddy currents in the magnetic metal layer 43b in the fusing belt 43. The coil housing case 63 houses the electromagnetic induction coils 62. Power supply to the electromagnetic induction coils 62 causes the electromagnetic induction coils 62 to generate magnetic flux, and the magnetic flux penetrates the magnetic metal layer 43b of the fusing belt 43, and the magnetic metal layer 43b generates eddy currents. Consequently, the magnetic metal layer 43b heats itself, and the fusing belt 43 is heated.

Figure 4:
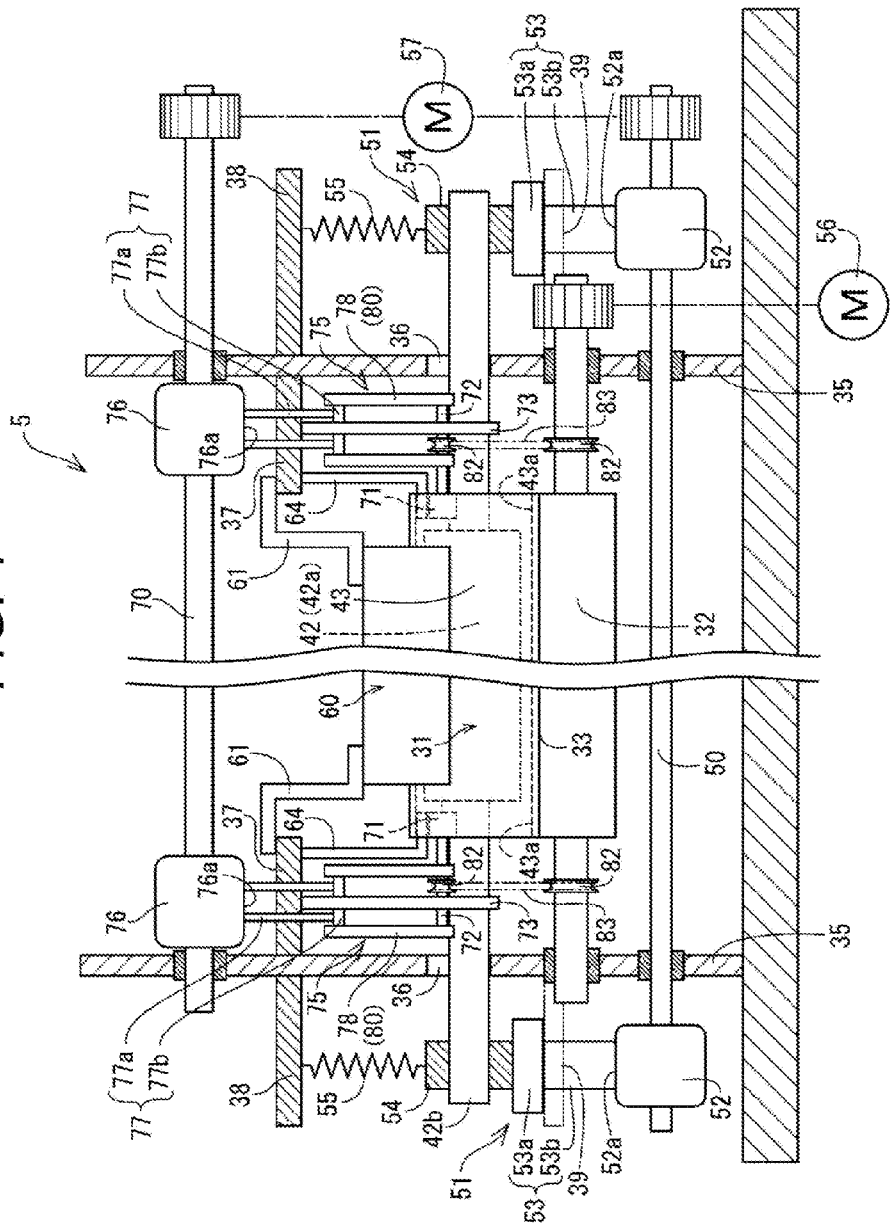
FIG. 4 is an explanatory cross-sectional view illustrating a power transmission system of the fuser during passage of sheet.
Figure 5:
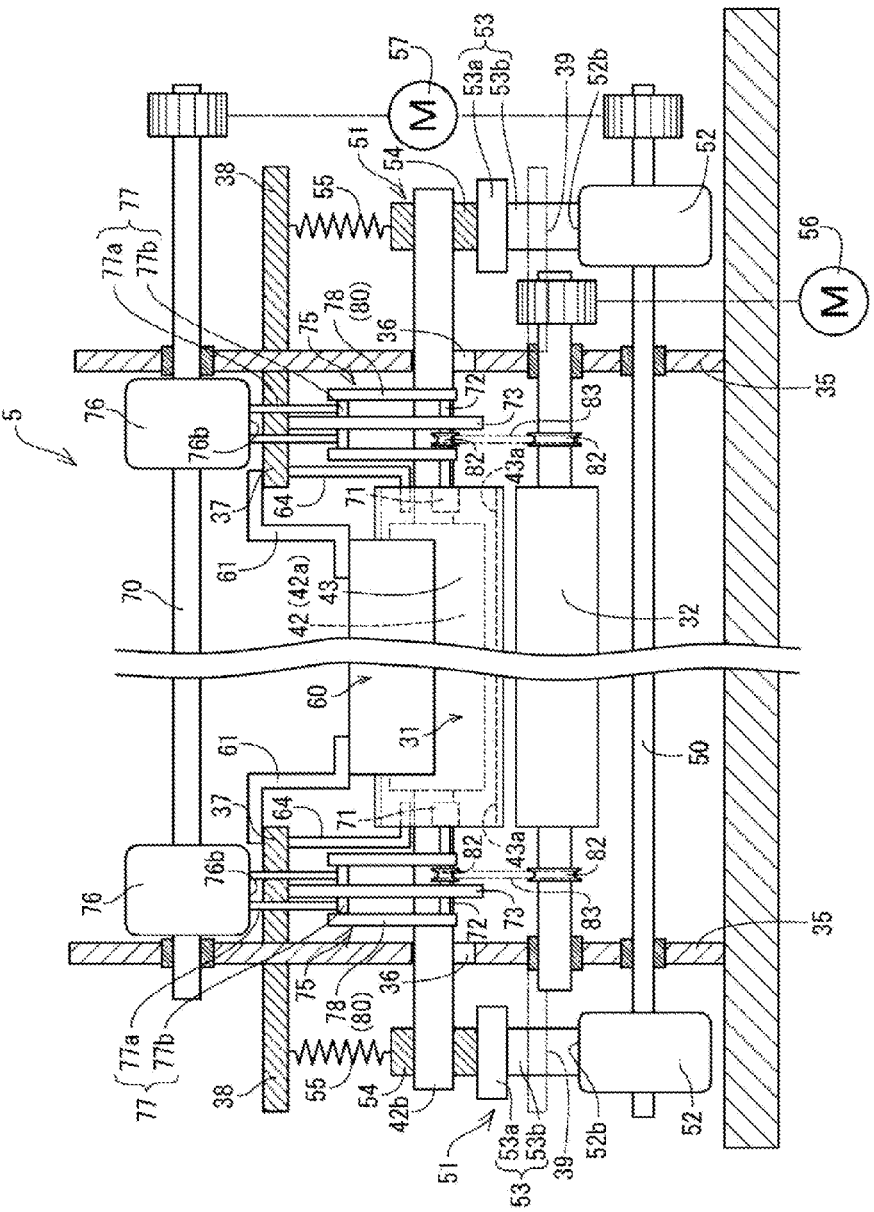
FIG. 5 is an explanatory cross-sectional view illustrating the power transmission system of the fuser during non-passage of sheet.
Figure 6:
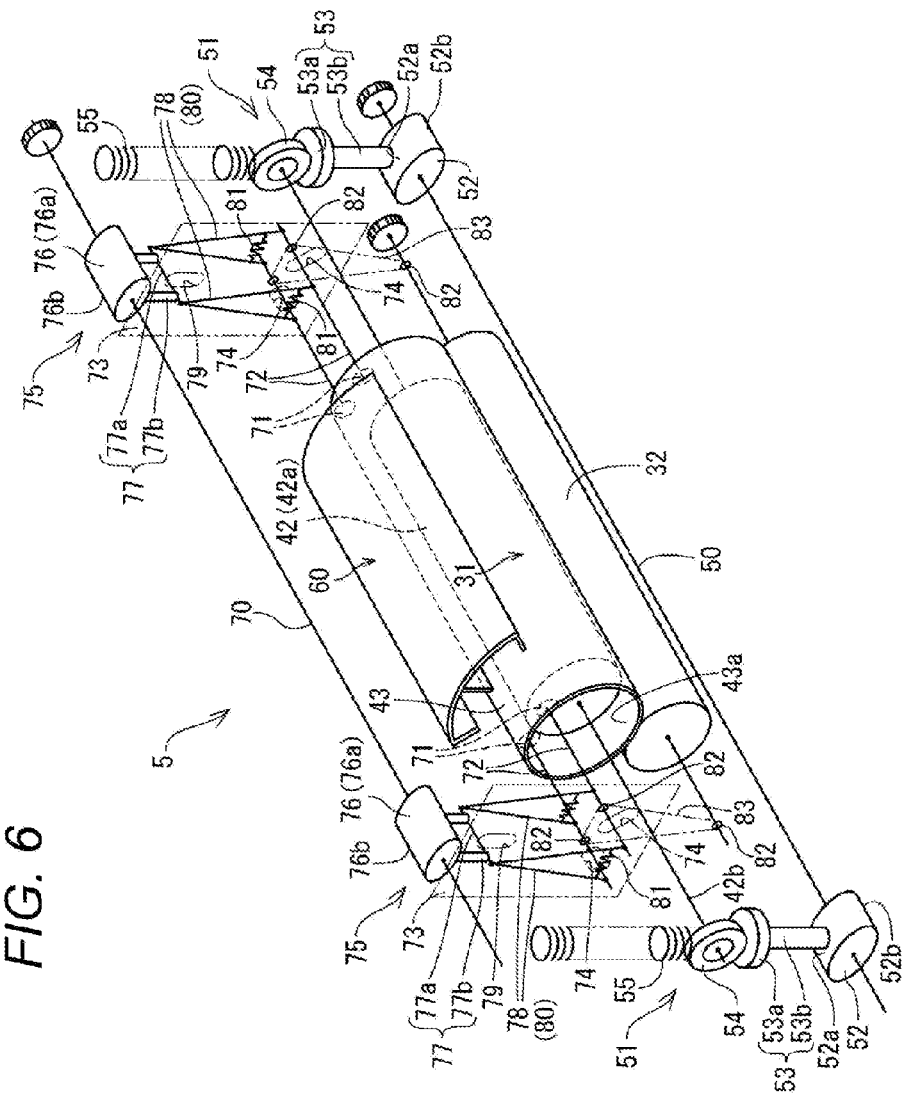
FIG. 6 is a skeletal view illustrating connection and disconnection operation of the fuser during passage of sheet.
Figure 7:
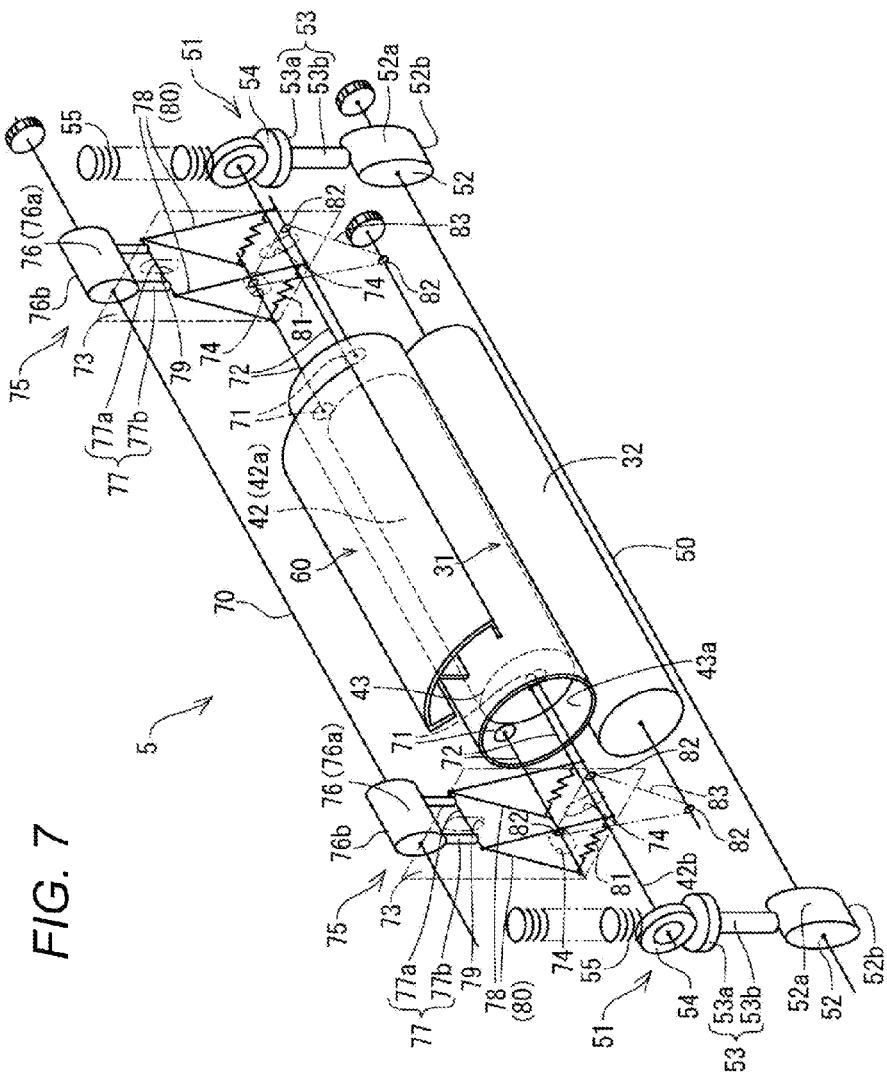
FIG. 7 is a skeletal view illustrating connection and disconnection operation of the fuser during non-passage of sheet.

As illustrated in FIGS. 4 and 5, each side plate 35 in the casing 2 is provided with an inner supporting plate 37 and an outer supporting plate 38. The inner supporting plate 37 projects in a direction in which the fusing and pressure roller members 31 and 32 are housed. The outer supporting plate 38 projects in the opposite direction to the inner supporting plate 37. The heating unit 60 is supported by a pair of the inner supporting plates 37 through connection brackets 61. In the first embodiment, each end of the coil housing case 63 in a direction of sheet passage width is mounted to one end side of the connection bracket 61. The other end side of the connection bracket 61 is mounted to the inner supporting plate 37.

It is noted that each connection bracket 61 is mounted with a belt holder 64 configured to define a fitting position of the fusing belt 43 relative to the fusing roller 42. Each belt holder 64 includes an outer plate portion configured to restrict the movement of the fusing belt 43 in the direction of sheet passage width, and an inner plate portion configured to restrict the movement of the fusing belt 43 in a direction of contact with the pressure roller member 32, and is formed into a substantially L-shape. The inner plate portion of each belt holder 64 is curved along an inner peripheral shape of each hollow end portion 43a of the fusing belt 43. A temperature sensor 65 (see FIG. 8) is disposed on or near an outer peripheral side of the fusing belt 43. According to a detection result of the temperature sensor 65, the electromagnetic induction coils 62 of the heating unit 60 is controlled to be on and off, and the fusing belt 43 is maintained at a predetermined fusing temperature.

The pressure roller member 32 is disposed on the opposite side to the heating unit 60 across the fusing roller member 31. The pressure roller member 32 has a roller shape (i.e., also referred to as a pressure roller). The pressure roller member 32 has shaft portions on both sides in the direction of sheet passage width, and the shaft portions are rotatably journaled by the pair of side plates 35 in the casing 2. The pressure roller member 32 is provided to be positionally fixed to the pair of side plates 35. The pressure roller member 32 has a rotational axis extending parallel with a rotational axis of the fusing roller 42. While the fusing roller 42 makes pressure-contact with the inner peripheral surface of the fusing belt 43, the pressure roller member 32 makes pressure-contact with an outer peripheral surface of the fusing belt 43. That is, the pressure roller member 32 makes pressure-contact with the fusing roller 42 through the fusing belt 43 (the fusing belt 43 is held between the pressure roller member 32 and the fusing roller 42). A portion (abutment portion) between the fusing belt 43 and the pressure roller member 32 is a fusing nip 33 as the fusing region.

Figure 2:
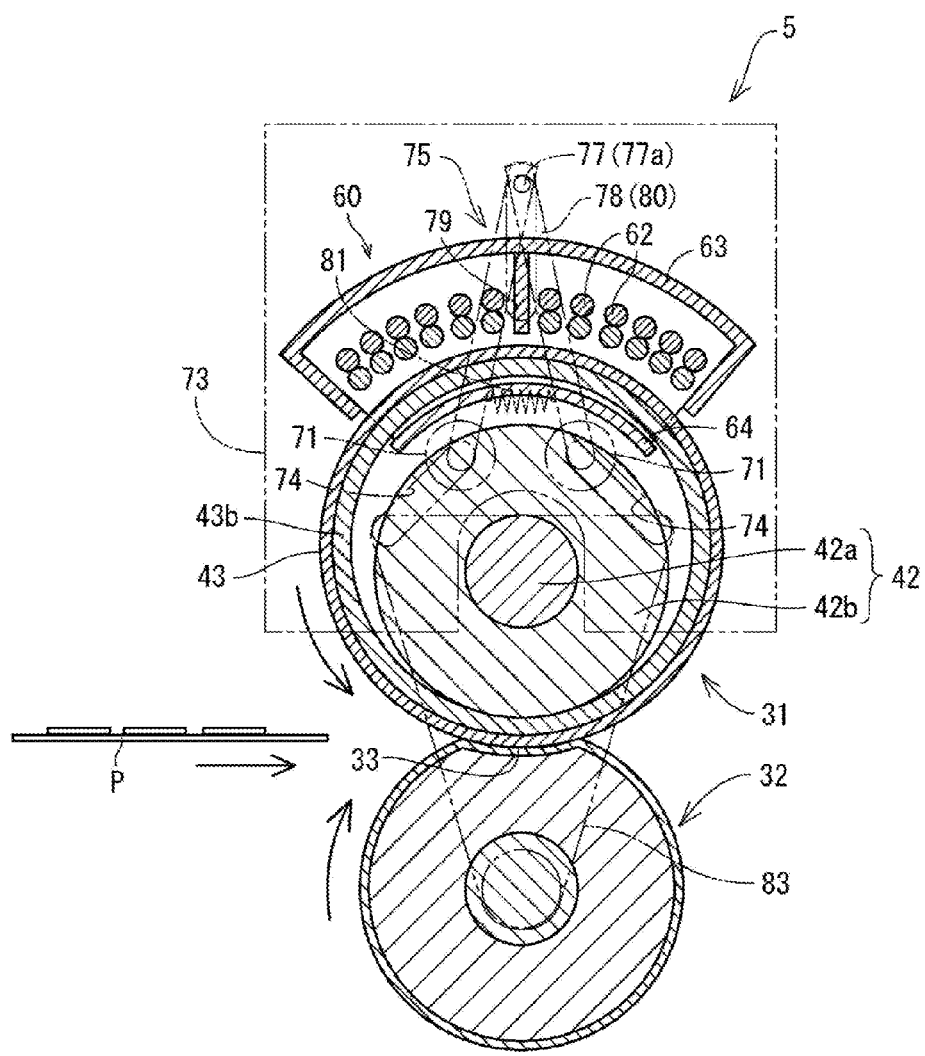
FIG. 2 is a schematic side cross-sectional view illustrating a fuser during passage of sheet according to a first embodiment.
Figure 3:
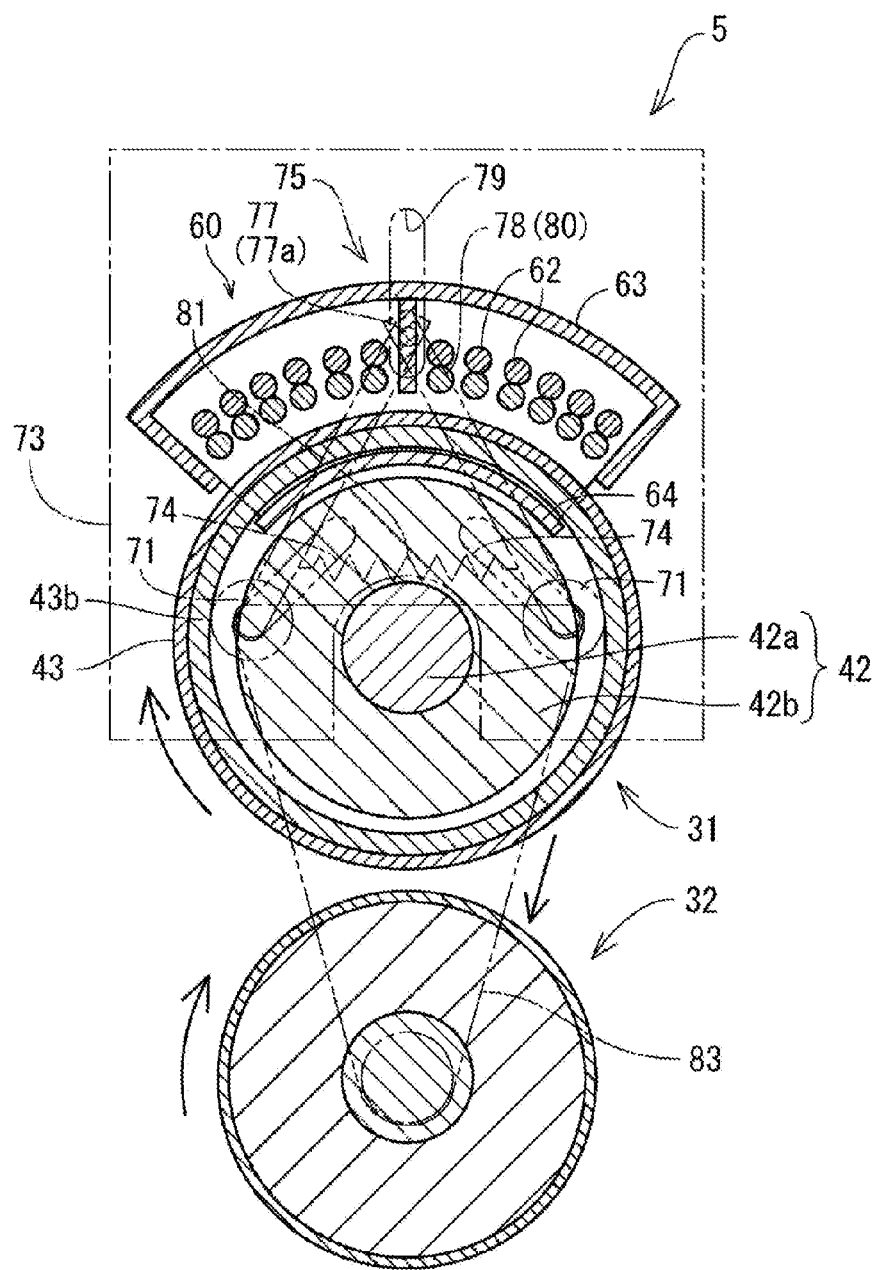
FIG. 3 is a schematic side cross-sectional view illustrating the fuser during non-passage of sheet.

Power is transmitted from a driving motor 56 (see FIGS. 4 and 5) as a driving source to the pressure roller member 32 through a power transmission system such as gear wheels or belts, and the pressure roller member 32 is rotated clockwise according to FIG. 2. With the rotation of the pressure roller member 32 or passage of the recording material P through the fusing nip 33, the fusing belt 43 is rotated in a direction opposite to the rotational direction of the pressure roller member 32 (counterclockwise according to FIG. 2).

A cam shaft 50 extending parallel with the rotational axes of the fusing roller 42 and the pressure roller member 32 is disposed on the opposite side to the fusing roller member 31 across the pressure roller member 32. The cam shaft 50 has both end sides in a direction of sheet passage width, both end sides are rotatably journaled in the pair of side plates 35 in the casing 2. The outer supporting plates 38 of both side plates 35 are disposed with a pair of cam mechanisms 51. The pair of cam mechanisms 51 is configured to move the fusing roller 42 to connect with and disconnect from the inner peripheral surface of the fusing belt 43. The pair of cam mechanisms 51 is symmetrically provided on both sides of the fusing and pressure roller members 31 and 32 in the direction of sheet passage width, and any of the cam mechanisms has the same basic configuration.

Each cam mechanism 51 includes a cam body 52, a receiver 53, and a compression spring 55. The cam body 52 is fixed to a projecting end of the cam shaft 50 (an end projecting toward the outer supporting plate 38 of the side plate 35). The receiver 53 abuts on a cam surface of the cam body 52, and moves in the connection/disconnection direction of the fusing roller member 31 and the pressure roller member 32. The compression spring 55 presses and urges the receiver 53 toward the cam body 52 through a bearing 54 fitted to each end of the mandrel portion 42a of the fusing roller 42 in the direction of sheet passage width.

The cam body 52 has an elliptic cylindrical shape, and has an outer peripheral surface defined as cam surfaces 52a and 52b. The outer peripheral surface of the cam body 52 includes a reference cam surface 52a and a protruding cam surface 52b which are formed to have different distances from the cam shaft 50. The receiver 53 is formed into a long shaft shape with a head portion 53b. The receiver 53 has a shaft portion 53a having a front end surface abutting on the cam surfaces 52a and 52b of the cam body 52. The head portion 53b of the receiver abuts on the bearing 54 of the fusing roller 42. The shaft portion 53a of the receiver 53 penetrates an auxiliary supporting plate 39 provided on side of the outer supporting plate 38 of the side plate 35. The auxiliary supporting plate 39 supports the receiver 53 to slide in the connection/disconnection direction of the fusing roller member 31 and the pressure roller member 32.

The compression spring 55 is mounted between the outer supporting plate 38 and the bearing 54 of the fusing roller 42. The compression spring 55 has one end side connected to the outer supporting plate 38, and the other end side fixed to the bearing 54 of the fusing roller 42. The compression spring 55 constantly presses and urges the receiver 53 to the cam body 52 through the bearing 54 of the fusing roller 42. Pressure-contact operation of the fusing roller 42 to the inner peripheral surface of the fusing belt 43 uses a resilient restoring force of the compression spring 55. Separating operation of the fusing roller 42 from the inner peripheral surface of the fusing belt 43 is performed against the resiliency of the compression spring 55.

Power is transmitted from a connection-disconnection motor 57 (see FIGS. 4 and 5) separate from the driving motor 56 to the camshaft 50 through the power transmission system such as the gear wheels or belts, the cam shaft 50 is turned to cause the reference cam surface 52a of the cam body 52 to abut on the front end surface of the shaft portion 53a of the receiver 53, and the receiver 53 is slidably moved in a pressure-contact direction in which the receiver 53 is moved away from the compression spring 55 by a resilient restoring force of the compression spring 55. Consequently, the bearing 54 is moved in the pressure-contact direction, the fusing roller 42 makes pressure-contact with the inner peripheral surface of the fusing belt 43, the fusing roller 42 and the pressure roller member 32 holds the fusing belt 43 therebetween, and the fusing nip 33 is formed.

Power of the connection-disconnection motor 57 further turns the cam shaft 50 to cause the protruding cam surface 52b of the cam body 52 to abut on the front end surface of the shaft portion 53a of the receiver 53, and the receiver 53 is slidably moved in a separating direction in which the receiver 53 is moved closer to the compression spring 55 against the resiliency of the compression spring 55. Consequently, the bearing 54 is moved in the separating direction, and the fusing roller 42 is separated from the inner peripheral surface of the fusing belt 43 (see FIGS. 5 and 7). When the fusing roller 42 is only separated from the inner peripheral surface of the fusing belt 43, the fusing belt 43 is floated in a direction in which the fusing belt 43 is separated from the pressure roller member 32, by the tension of the fusing belt 43 itself, and the fusing belt 43 and the pressure roller member 32 are substantially separated into a linear contact state.

An auxiliary cam shaft 70 is disposed on the opposite side to the fusing roller member 31 across the heating unit 60, and the auxiliary cam shaft 70 extends parallel with the rotational axes of the fusing roller 42 and the pressure roller member 32. Both end sides of the auxiliary cam shaft 70 in a direction of sheet passage width are rotatably journaled in the pair of side plates 35 in the casing 2, similarly to the cam shaft 50. The inner supporting plates 37 of both side plates 35 are disposed with a group of tension rollers 71 as a tension body moved to be connected to and disconnected from the inner peripheral surface of the fusing belt 43, separately from the fusing roller 42, and a pair of auxiliary cam mechanisms 75 configured to connect and disconnect the group of tension rollers 71 to and from the inner peripheral surface of the fusing belt 43.

In the first embodiment, four tension rollers 71, i.e., one set of two tension rollers 71, is disposed on either end side of the fusing belt 43, in the direction of sheet passage width. One set of two tension rollers 71 is associated with one auxiliary cam mechanism 75. Each tension roller 71 is positioned on the inner peripheral side of the sheet non-passage area on either longitudinal end side of the fusing belt 43. That is, the one set of two tension rollers 71 is disposed in each hollow end portion 43a of the fusing belt 43. Each tension roller 71 has a turning shaft 72 extending in a direction in which the turning shaft 72 is separated from each hollow end portion 43a of the fusing belt 43, and parallel with the rotational axes of the fusing roller 42 and the pressure roller member 32. Each turning shaft 72 is fixed with the corresponding tension roller 71.

Here, the inner supporting plate 37 is provided with a guide plate 73 facing each hollow end portion of the fusing belt. The guide plate 73 includes a pair of inclined elongated holes 74 formed to have an interval increasing as the inclined elongated holes are separated from the inner supporting plate 37. Each inclined elongated hole 74 receives the corresponding turning shaft 72 inserted. Therefore, each tension roller 71 can slide along the inclined elongated hole 74, and thus, each tension roller 71 can be (absolutely) moved to be connected to and disconnected from the inner peripheral surface of the hollow end portion 43a of the fusing belt 43.

The pair of auxiliary cam mechanisms 75 is symmetrically provided on both sides of the fusing and pressure roller members 31 and 32 in the direction of sheet passage width, and any of the auxiliary cam mechanisms has the same basic configuration. Each auxiliary cam mechanism 75 is associated with the connection and disconnection movement of the fusing roller 42, and is configured to move the group of the tension rollers 71 to connect to and disconnect from the inner peripheral surface of the fusing belt 43, contrary to the connection and disconnection movement of the fusing roller 42. In this configuration, each auxiliary cam mechanism 75 includes an auxiliary cam body 76, a sliding shaft body 77, and a pair of V-shaped links 78. The auxiliary cam body 76 is fixed to a portion near an end of the auxiliary cam shaft 70 in a direction of sheet passage width (portion near the inner supporting plate 37). The sliding shaft body 77 abuts on a cam surface of the auxiliary cam body 76, and is moved along the connection/disconnection direction of the fusing roller member 31 and the pressure roller member 32. The pair of V-shaped links 78 connects the sliding shaft body 77 and the turning shaft 72 of each tension roller 71.

The auxiliary cam body 76 has an elliptic cylindrical shape, similarly to the cam body 52, and has an outer peripheral surface defined as cam surfaces 76*a* and 76*b*. The outer peripheral surface of the auxiliary cam body 76 includes a reference cam surface 76*a* and a protruding cam surface 76*b* which are formed to have different distances from the cam shaft 70. As can be seen from the position of the auxiliary cam shaft 70, the auxiliary cam body 76 is positioned on the opposite side to an end of the fusing roller 42 (mandrel portion 42*a*) in the direction of sheet passage width, across the inner supporting plate 37.

The sliding shaft body 77 is formed into a substantially portal shape, and includes a support shaft portion 77*a* and a pair of abutment rod portions 77*b*. The support shaft portion 77*a* extends parallel with the auxiliary cam shaft 70. The pair of abutment rod portions 77*b* projects in the same direction from both end sides of the support shaft portion 77*a*. Here, the guide plate 73 includes, separately from the pair of inclined elongated holes 74, an elongated guide hole 79 formed to be elongated in the connection/disconnection direction of the fusing roller member 31 and the pressure roller member 32. The support shaft portion 77*a* of the sliding shaft body 77 is inserted into the elongated guide hole 79. Therefore, the sliding shaft body 77 is configured to be slid along the elongated guide hole 79 in the guide plate 73. It is noted that the elongated guide hole 79 and the pair of inclined elongated holes 74 are positioned to have a radial form in the guide plate 73. The pair of abutment rod portions 77*b* is divided on both sides of the guide plate 73. Each abutment rod portion 77*b* penetrates the inner supporting plate 37, and the abutment rod portion 77*b* has a front end surface abutting on the cam surfaces 76*a* and 76*b* of the auxiliary cam body 76. The inner supporting plate 37 supports each abutment rod portion 77*b* to slide in the connection/disconnection direction of the fusing roller member 31 and the pressure roller member 32.

The pair of V-shaped links 78 is divided on both sides of the guide plate 73. Both V-shaped links 78 are configure to be symmetrical with respect to the guide plate 73. Each V-shaped link 78 includes two link rods 80. The two link rods 80 have base end sides turnably mounted to the support shaft portion 77*a* of the sliding shaft body 77 so as to overlap with each other. Each link rod 80 has a front end side turnably mounted to either one of the turning shafts 72 configured to support the one set of two tension rollers 71. Accordingly, the one set of two tension rollers 71 are coupled to the sliding shaft body 77 through the pair of V-shaped links 78.

Between the front end sides of the two link rods 80, a tension spring 81 is mounted. The tension spring 81 constantly pulls and urges both link rods 80 in a direction an included angle between the link rods 80 is reduced. Separating operation of the tension rollers 71 from the inner peripheral surface of the fusing belt 43 is performed with resilient restoring forces of the tension springs 81, by guiding the turning shafts 72 in both inclined elongated holes 74 toward a side having a small interval therebetween. Pressure-contact operation of the tension rollers 71 with the inner peripheral surface of the fusing belt 43 is performed against resiliency of the tension springs 81, by guiding the turning shafts 72 in both inclined elongated holes 74 toward a side having a large interval therebetween.

When power is transmitted from the connection-disconnection motor 57 (see FIGS. 4 and 5) to the auxiliary cam shaft 70 through the power transmission system such as the gearwheels or the belts, and the auxiliary cam shaft 70 is turned to cause the reference cam surface 76*a* of the auxiliary cam body 76 to face the front end surfaces of both abutment rod portions 77*b* of the sliding shaft body 77, the V-shaped links 78 are turned to reduce the included angles therebetween, with the resilient restoring forces of the tension springs 81. Each turning shaft 72 is guided toward a side having a small interval between both inclined elongated holes 74 in the guide plate 73, the sliding shaft body 77 is slidably moved toward the auxiliary cam body 76, and the front end surfaces of both abutment rod portions 77*b* of the sliding shaft body 77 are caused to abut on the reference cam surface 76*a* of the auxiliary cam body 76. Therefore, the tension roller 71 journal on each turning shaft 72 is separated from the inner peripheral surface of the fusing belt 43 (see FIGS. 4 and 6). In this configuration, power of the connection-disconnection motor 57 brigs the fusing roller 42 into pressure-contact with the inner peripheral surface of the fusing belt 43, and the fusing nip 33 is formed.

When power of the connection-disconnection motor 57 further turns the auxiliary cam shaft 70 to cause the protruding cam surface 76*b* of the auxiliary cam body 76 to abut on the front end surfaces of both abutment rod portions 77*b* of the sliding shaft body 77, the sliding shaft body 77 is slidably moved away from the auxiliary cam body 76, each turning shaft 72 is guided toward a side having a large interval between both inclined elongated holes 74 in the guide plate 73, and the V-shaped link 78 is turned, against the resiliency of the tension spring 81, to increase the included angle. Consequently, the tension roller 71 journaled on each turning shaft 72 abuts on the inner peripheral surface of the fusing belt 43 (see FIGS. 5 and 7). Therefore, in this condition, power of the connection-disconnection motor 57 separates the fusing roller 42 from the inner peripheral surface of the fusing belt 43, the group of the tension rollers 71 applies tension to the fusing belt 43 floating away from the pressure roller member 32 by the tension of itself, along the conveying direction S, and the fusing belt 43 and the pressure roller member 32 in the linear contact state are completely separated.

Auxiliary pulleys 82 are fixed to a group of the turning shafts 72 of the one set of two tension rollers 71 and a corresponding shaft portion of the pressure roller member 32, respectively. As a rotation transmitting unit, an auxiliary power transmission belt 83 having an endless shape is wound around the three auxiliary pulleys 82. While the fusing roller 42 is separated from and the group of the tension rollers 71 makes contact with the inner peripheral surface of the fusing belt 43, a rotational force of the pressure roller member 32 is transmitted to the group of the tension rollers 71 through the three auxiliary pulleys 82 and the auxiliary power transmission belt 83, and the fusing belt 43 is rotated circumferentially by a contact friction force with the group of the tension rollers 71. In the first embodiment, the fusing belt 43 is rotated in the same direction as the pressure roller member 32.

Therefore, even while the group of the tension rollers 71 completely separates the fusing roller 42, the fusing belt 43, and the pressure roller member 32 from each other during non-passage of sheet (e.g., during warming up or standby), the auxiliary power transmission belt 83 and the group of the tension rollers 71 can transmit the rotational force of the pressure roller member 32 to the fusing belt 43, and the heating unit 60 can uniformly heat the fusing belt 43 along the circumferential direction (rotational direction). Only the group of the tension rollers 71 mainly makes contact with the fusing belt 43 during non-passage of sheet, so that the heat loss from the fusing belt 43 is securely restricted, and the temperature of the fusing belt 43 is readily maintained substantially uniformly as a whole. Temperature rise of the fusing belt 43 is efficiently improved, the warm-up time or the first copy output time (FCOT) is reduced, and power consumption is reduced.

Further, the fusing roller 42 can be moved to be connected to and disconnected from the inner peripheral surface of the fusing belt 43, the group of the tension rollers 71 is associated with the connection and disconnection movement of the fusing roller 42 and can be moved to be connected to and disconnected from the inner peripheral surface of the fusing belt 43, contrary to the connection and disconnection movement of the fusing roller 42, the fusing roller 42 and the group of the tension rollers 71 do not constantly make pressure-contact with the fusing belt 43, and wear resistance (durability) of the fusing belt 43 is also improved. The life of the fusing belt 43 is also increased.

It is noted that, in the first embodiment, each tension roller 71 has a hardness set lower than that of the fusing belt 43. For example, each tension roller 71 includes silicone rubber in consideration of heat resistance. The tension roller has an Asker C hardness of approximately 10°. According to such a configuration, even if the group of the tension rollers 71 is brought into contact with the inner peripheral surface of the fusing belt 43, an excessive stress is not applied to the fusing belt 43, and the wear resistance (durability) of the fusing belt 43 is also effectively improved.

(3) Configuration of Control Unit and Aspect of Fusing Control

Next, a configuration of the control unit 28 and one example of fusing control by the control unit 28 will be described with reference to FIG. 8 and FIG. 9. The control unit 28 is basically configured to receive an image signal having been transmitted from an external terminal (not illustrated) or the like, digitize the image signal into Y-, M-, C-, and K-color image data, and control the image processor 3, the paper feeder 4, or the like to perform printing operation.

Figure 8:
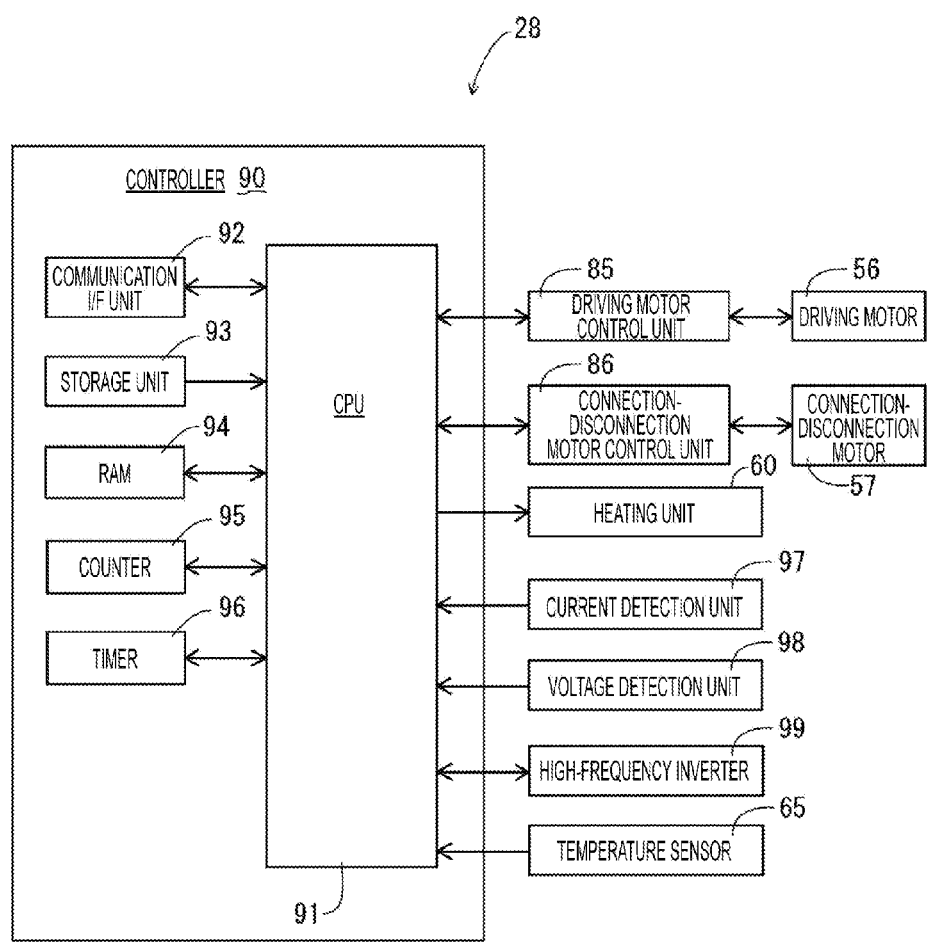
FIG. 8 is a functional block diagram illustrating a structure of a control unit.

As illustrated in FIG. 8, the control unit 28 includes a controller 90, a driving motor control unit 85, a connection-disconnection motor control unit 86, and the like. The controller 90 generally controls the printer 1. The driving motor control unit 85 controls the start and stop, and speed, such as acceleration or deceleration, of the driving motor 56 configured to rotate the pressure roller member 32. The connection-disconnection motor control unit 86 controls the start and stop, and speed, such as acceleration or deceleration, of the connection-disconnection motor 57 configured to rotate the camshaft 50 and the auxiliary cam shaft 70. The controller 90 includes a communication interface (I/F) unit 92, a storage unit 93, a RAM 94, a counter 95, a timer 96, and the like, in addition to a CPU 91 configured to execute various arithmetic processing or control. The communication interface (I/F) unit 92 is used for connection with the external terminal. The storage unit 93 includes an EEPROM, a flash memory, or the like. The RAM 94 temporarily stores a control program or data. The counter 95 measures the number of recording materials P to be conveyed, or the like. The timer 96 measures time.

The controller 90 is electrically connected with a heating unit 60, a current detection unit 97, a voltage detection unit 98, a high-frequency inverter 99, and a temperature sensor 65. The heating unit 60 as a heat source heats the fusing belt 43. The current detection unit 97 detects a current supplied to the electromagnetic induction coil 62 of the heating unit 60. The voltage detection unit 98 detects voltage supplied thereto. The high-frequency inverter 99 supplies high-frequency power to the electromagnetic induction coil 62. The temperature sensor 65 measures the temperature of the fusing belt 43. Detection results of the current detection unit 97 and the voltage detection unit 98 are transmitted to the control unit 28. In the control unit 28, a value of power to be supplied to the electromagnetic induction coil 62 is obtained based on the detection results of the current detection unit 97 and the voltage detection unit 98. The control unit 28 controls the high-frequency inverter 99 to adjust power supplied to the electromagnetic induction coil 62, and performs fusing control so that the temperature of the fusing belt 43 is within a predetermined fusing temperature range.

Figure 9:
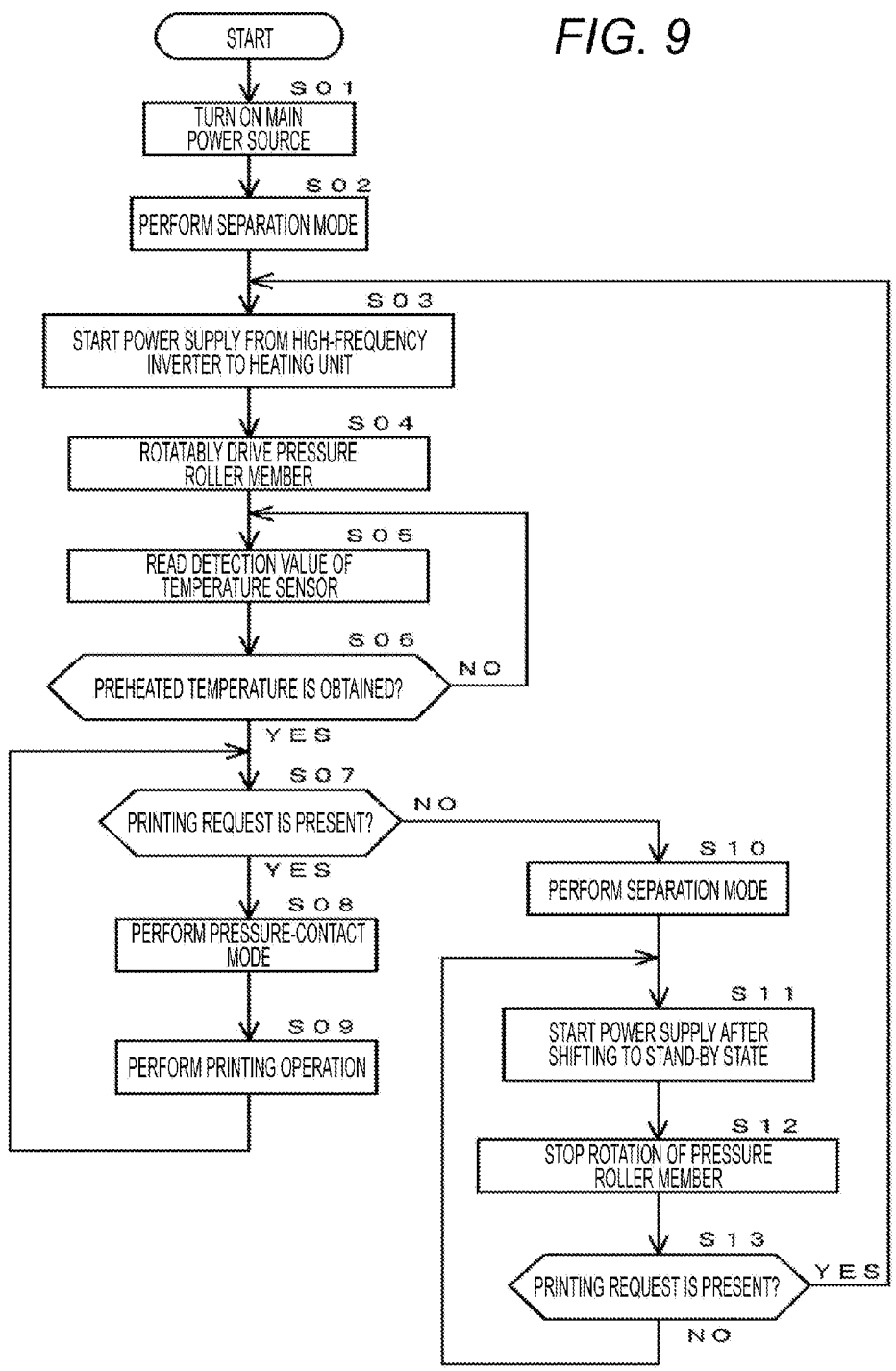
FIG. 9 is a flowchart illustrating one example of fusing control.

FIG. 9 illustrates one example of the fusing control by the control unit 28. Algorithm illustrated in a flowchart disclosed below is previously stored as a program in the storage unit 93 of the controller 90, read from the RAM 94, and executed by the CPU 91.

As illustrated in FIG. 9, in the fusing control, a main power source of the printer 1 is turned on (S01), and, as initialization, a separation mode is performed in which the fusing roller 42, the fusing belt 43, and the pressure roller member 32 are separated by driving the connection-disconnection motor 57, and the group of the tension rollers 71 is caused to abut on the inner peripheral surface of the fusing belt 43 (S02). Further, the control unit 28 starts warming up the fuser 5, and starts supplying power from the high-frequency inverter 99 to the heating unit 60 (S03).

Next, the driving motor 56 is driven to rotate the pressure roller member 32 (S04), the rotational force of the pressure roller member 32 is transmitted to the fusing belt 43 through the auxiliary power transmission belt 83 and the group of the tension rollers 71, and fusing belt 43 having been separated from the pressure roller member 32 is rotated circumferentially. Therefore, the heating unit 60 uniformly heats the fusing belt 43 along the circumferential direction thereof. Further, the detection result of the temperature sensor 65 is read (S05), and when the temperature of the fusing belt 43 as the detection result of the temperature sensor 65 reaches a predetermined preheated temperature (S06: YES), the presence or absence of a printing request from the external terminal or the like is determined after the end of the warming up (S07).

When the printing request is present (S07: YES), a pressure-contact mode is performed for bringing the fusing roller 42 into contact with the pressure roller member 32 through the fusing belt 43, and separating the group of the tension rollers 71 from the inner peripheral surface of the fusing belt 43 (S08). The printing operation is performed (S09), and the process returns to step S07.

When the printing request is not present (S07: NO), the separation mode is performed in which the fusing roller 42, the fusing belt 43, and the pressure roller member 32 are separated by driving the connection-disconnection motor 57, and the group of the tension rollers 71 is caused to abut on the inner peripheral surface of the fusing belt 43 (S10). The process shifts to a stand-by state waiting for a next printing request, and power supply from the high-frequency inverter 99 to the heating unit 60 is stopped, while maintaining the separation mode (S11). Then, the driving of the driving motor 56 is stopped to stop the rotation of the pressure roller member 32 (S12). In this condition, only the group of the tension rollers 71 mainly makes contact with the fusing belt 43, so that the heat loss from the fusing belt 43 is securely restricted, and the temperature of the fusing belt 43 is readily maintained substantially uniformly as a whole. In step S12, it is preferable that power supply to the heating unit 60 is controlled to be turned on and off according to the detection result of the temperature sensor 65, and the driving motor 56 intermittently rotates the pressure roller member 32, in order to control the temperature to hold the fusing belt 43 in a predetermined temperature range.

Next, the presence or absence of the printing request is determined again (S13), and when the printing request is not present (S13: NO), the process returns to step S11 to continue the stand-by state. When the printing request is present (S13: YES), the process returns to step S03 to perform the warming up.

(4) Summary of First Embodiment

As apparent from the description having been described above and FIGS. 4 to 7, according to the configuration of the first embodiment, the fuser 5 for fixing the unfixed toner image on the recording material P, includes the endless belt body 43, the pressing body 42, the pressure roller member 32, the tension body 71, and the rotation transmitting unit 83. The endless belt body 43 is heated by the heat source 60. The pressing body 42 is moved to be connected to and disconnected from the inner peripheral surface of the belt body 43. The pressure roller member 32 makes pressure-contact with the pressing body 42 through the belt body 43. The tension body 71 is moved to be connected to and disconnected from the inner peripheral surface of the belt body 43, contrary to the connection and disconnection movement of the pressing body 42. The rotation transmitting unit 83 transmits the rotational force of the pressure roller member 32 to the belt body 43 using the tension body 71, while the pressing body 42 is separated from and the tension body 71 makes contact with the inner peripheral surface of the belt body 43. Owing to the configuration, during non-passage of sheet (e.g., during warming up or standby), the pressing body 42 and the belt body 43 are separated from each other, the tension body 71 applies tension to the belt body 43, and the belt body 43 and the pressure roller member 32 are separated from each other. Further, even while the pressing body 42, the belt body 43, and the pressure roller member 32 are separated from each other, the rotation transmitting unit 83 transmits the rotational force of the pressure roller member 32 to the belt body 43, using the tension body 71. Therefore, even during non-passage of sheet, the heat source 60 can uniformly heat the belt body 43 along the circumferential direction (rotational direction).

Therefore, only the tension body 71 mainly makes contact with the belt body 43 during non-passage of sheet, the heat loss from the belt body 43 is securely restricted, and the temperature of the belt body 43 is readily maintained substantially uniformly as a whole. Therefore, temperature rise of the belt body 43 is efficiently improved, the warm-up time or the first copy output time (FCOT) is reduced, and power consumption is reduced.

Further, the pressing body 42 can be moved to be connected to and disconnected from the inner peripheral surface of the belt body 43, and the tension body 71 is associated with the connection and disconnection movement of the pressing body 42, and is moved to be connected to and disconnected from the inner peripheral surface of the belt body 43, contrary to the connection and disconnection movement of the pressing body 42 Therefore, the pressing body 42 and the tension body 71 do not constantly make pressure-contact with the belt body 43, and wear resistance (durability) of the belt body 43 is also improved. The life of the belt body 43 is also increased.

In the first embodiment, the tension body 71 is disposed on the inner peripheral side of the sheet non-passage area on either longitudinal end side of the fusing belt 43. Therefore, a contact area of the tension body with the fusing belt is reduced, and further the tension body 71 is brought into contact with only an area not affecting the fixing of the toner image on the recording material P, on the inner peripheral surface of the belt body 43, and heat radiation from the belt body 43 is further reduced. Further, the wear resistance (durability) of the belt body 43 is improved, or the life of the belt body 43 is increased.

(5) Configuration of Fuser According to Second Embodiment

Figure 10:
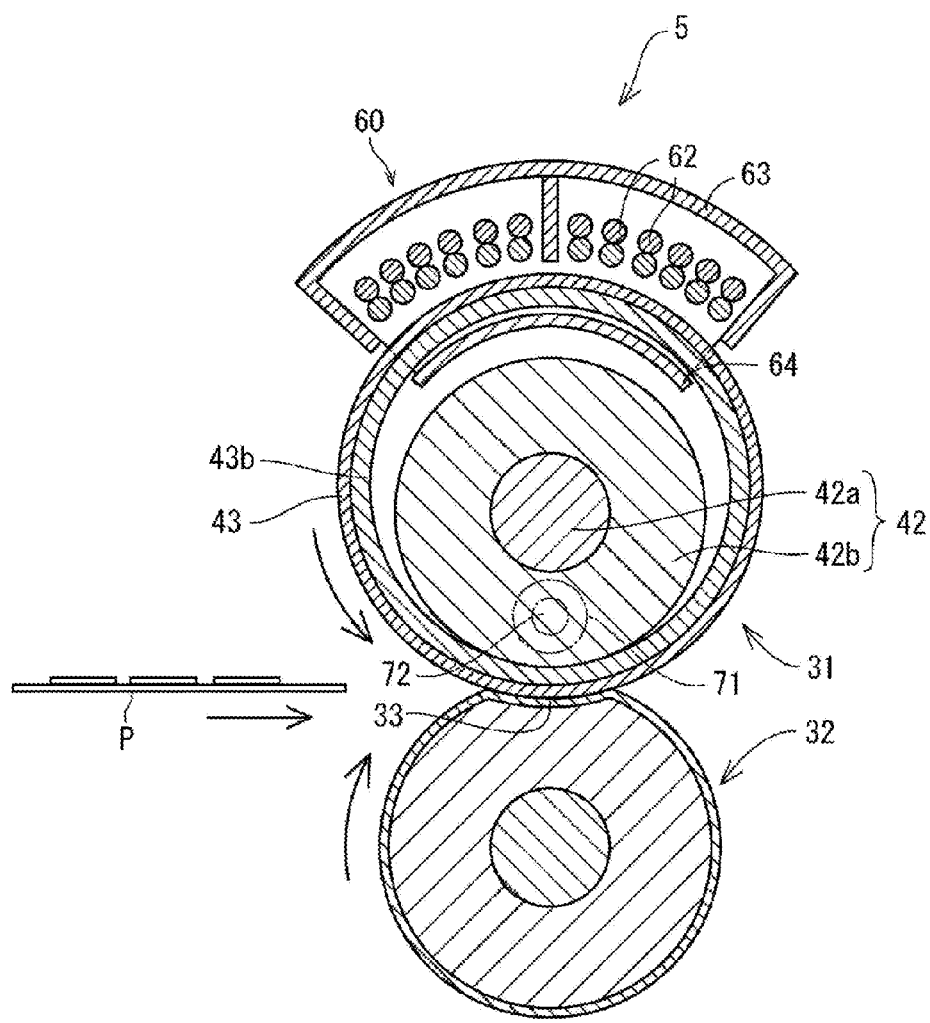
FIG. 10 is a schematic side cross-sectional view illustrating a fuser during passage of sheet according to a second embodiment.
Figure 11:
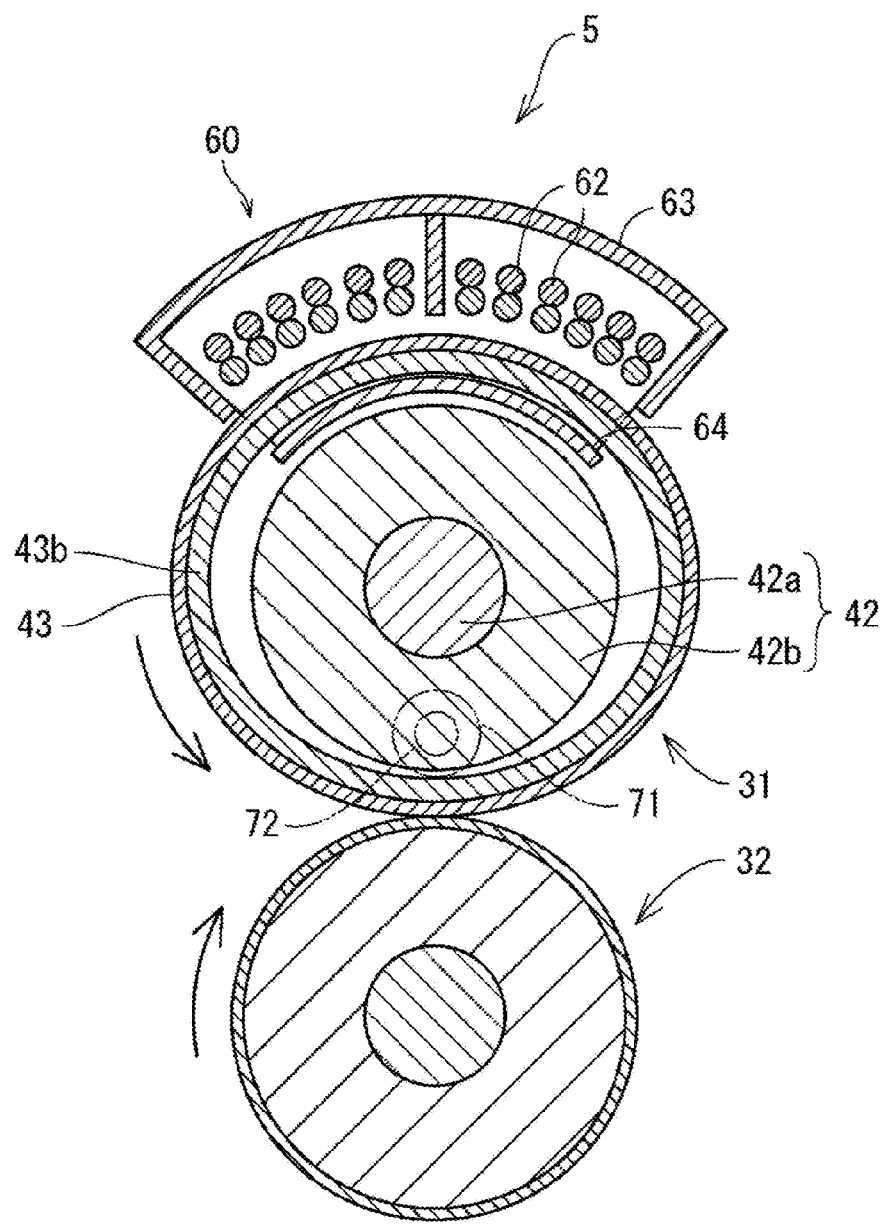
FIG. 11 is a schematic side cross-sectional view illustrating the fuser during non-passage of sheet.
Figure 12:
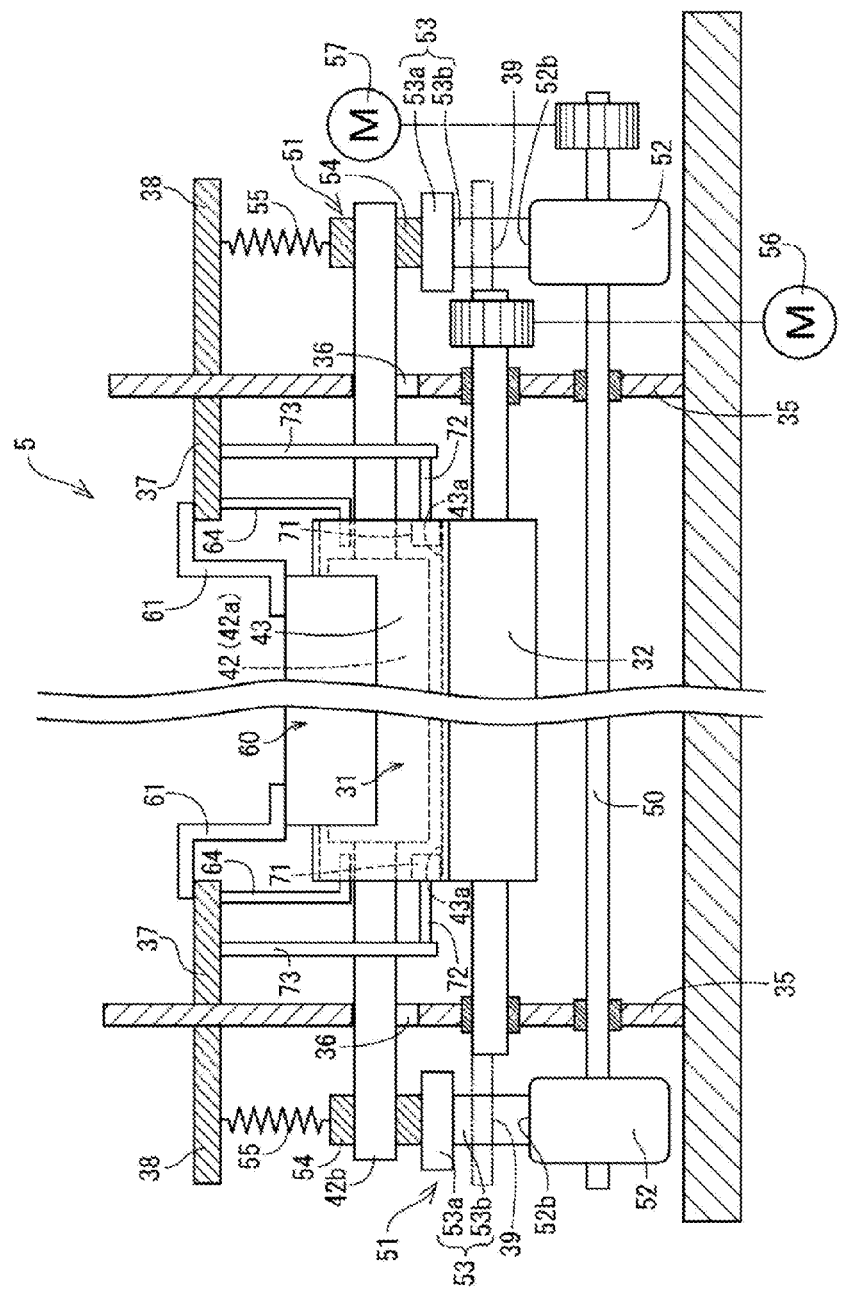
FIG. 12 is an explanatory cross-sectional view illustrating a power transmission system of the fuser during non-passage of sheet.

Next, a configuration of a fuser 5 according to a second embodiment will be described with reference to FIGS. 10 to 12. In the fuser 5 according to the second embodiment, the group of the auxiliary cam mechanisms 75 according to the first embodiment is removed, and one tension roller 71 is disposed on either end side of a fusing belt 43 in a direction of sheet passage width, respectively. Each tension roller 71 is positioned on the inner peripheral side of a sheet non-passage area on each longitudinal end side of the fusing belt 43, or in each hollow end portion 43a of the fusing belt 43, similarly to the first embodiment. A turning shaft 72 of each tension roller 71 is mounted to be positionally fixed to a corresponding guide plate 73. Each tension roller 71 is turnably journaled on the turning shaft 72. The other configurations are the same as those of the first embodiment.

When a fusing roller 42 is separated from an inner peripheral surface of the fusing belt 43, the fusing belt 43 is floated in a direction in which the fusing belt 43 is separated from a pressure roller member 32, by the tension of the fusing belt 43 itself, similarly to the first embodiment. Therefore, each tension roller 71 can be moved to be connected and disconnected relative to the inner peripheral surface of the hollow end portion 43a of the fusing belt 43. When the fusing roller 42 is separated from the inner peripheral surface of the fusing belt 43, the fusing belt 43 and the pressure roller member 32 are substantially separated into a linear contact state. A mounting position of the tension roller 71 to each guide plate 73 is defined (see FIGS. 11 and 12) so that each tension roller 71 abuts on the inner peripheral surface of the fusing belt 43 in this linear contact state. In such a linear contact state, the fusing belt 43 is held between the pressure roller member 32 and each tension roller 71.

In the second embodiment, the fusing belt 43 is held between each tension roller 71 and the pressure roller member 32 while the fusing roller 42 and the fusing belt 43 are completely separated, even without the group of the auxiliary cam mechanisms 75 as described in the first embodiment. Therefore, the fusing belt 43 and each tension roller 71 can make contact with each other with a considerably light force compared with that during passage of sheet (while fusing nip 33 is formed), and a contact surface pressure of each tension roller 71 to the fusing belt 43 can be reduced. Accordingly, wear of the fusing belt 43 is restricted. The fusing belt 43 is held between each tension roller 71 and the pressure roller member 32 while the contact surface pressure of each tension roller 71 to the fusing belt 43 is reduced, and a rotational force of the pressure roller member 32 is directly transmitted to the fusing belt 43. Accordingly, even during non-passage of sheet, the fusing belt 43 is smoothly rotated circumferentially (rotational direction), and the heating unit 60 can uniformly heat the fusing belt 43 along the circumferential direction thereof. The fusing belt 43 according to the second embodiment rotates in a direction reverse to the pressure roller member 32, similarly to during passage of sheet.

That is, a group of the tension rollers 71 and the pressure roller member 32 in the linear contact state mainly make contact with the fusing belt 43 during non-passage of sheet. Therefore, heat radiation from the fusing belt 43 can be restricted, even with the configuration according to the second embodiment. A simple configuration of the tension roller provided to be positionally fixed to the guide plate 73 achieves uniform heating (restriction of heat radiation) and wear resistance of the fusing belt 43 during non-passage of sheet, while saving space.

(6) Configuration of Fuser According to Third Embodiment

Figure 13:
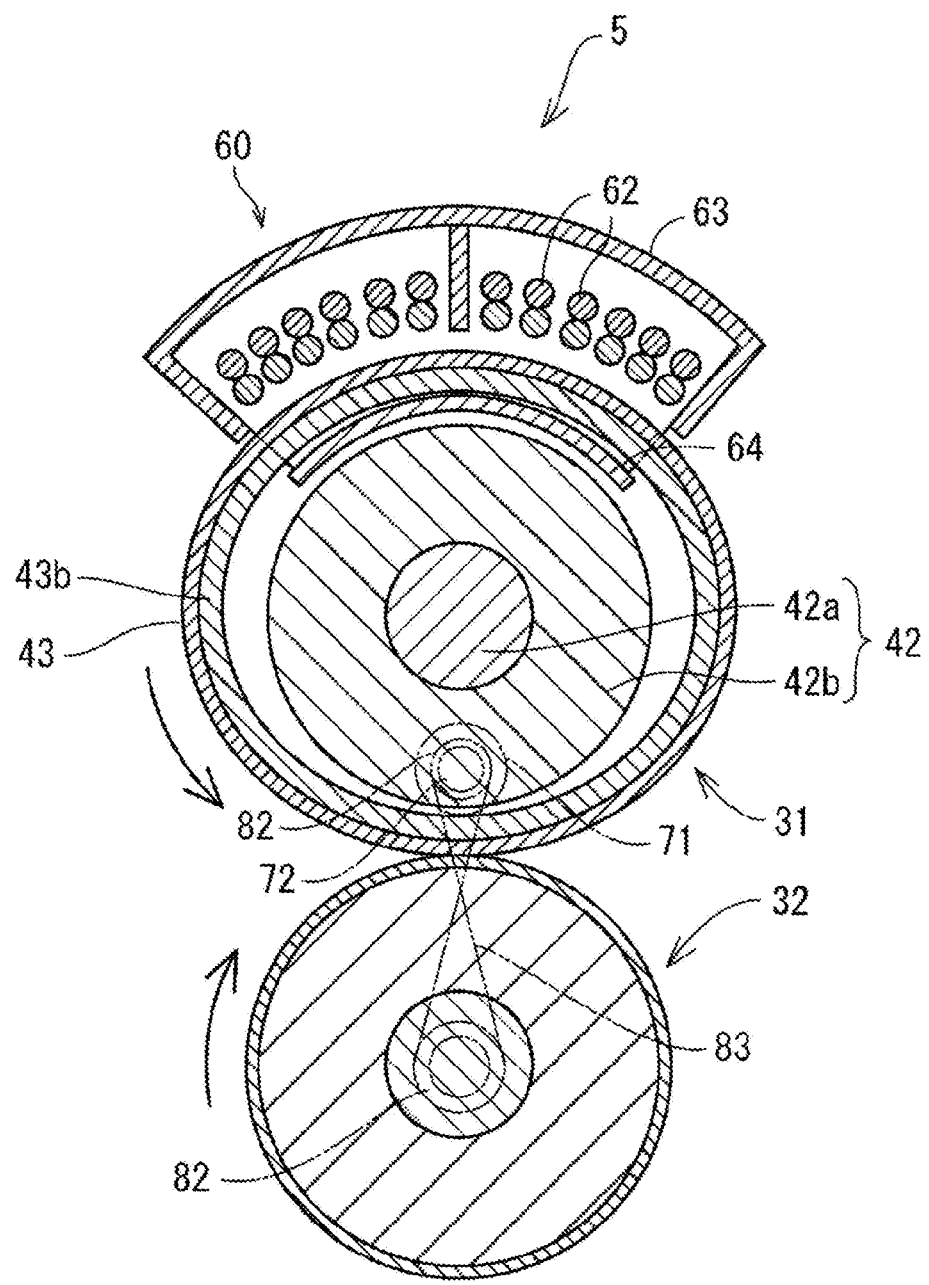
FIG. 13 is a schematic side cross-sectional view illustrating a fuser during non-passage of sheet according to a third embodiment.

Next, a configuration of a fuser 5 according to a third embodiment will be described with reference to FIG. 13. The fuser 5 according to the third embodiment is a modification of the second embodiment. In the third embodiment, a turning shaft 72 of each tension roller 71 is rotatably journaled in a corresponding guide plate 73. Each tension roller 71 is fixed to a turning shaft 72. Auxiliary pulleys 82 are fixed to a group of the turning shafts 72 of respective tension rollers 71, and corresponding shaft portions of a pressure roller member 32. An auxiliary power transmission belt 83 as a rotation transmitting unit is wound and crossed around both auxiliary pulleys 82. The other configurations are similar to those of the second embodiment. According to the configuration of the third embodiment, a rotational force of the pressure roller member 32 can be transmitted also to a group of the tension rollers 71 through the pair of auxiliary pulleys 82 and the auxiliary power transmission belt 83, and a fusing belt 43 is securely rotated circumferentially by a direct contact friction force with the pressure roller member 32, and a contact friction force through group of the tension rollers 71. Accordingly, even during non-passage of sheet, the fusing belt 43 is smoothly rotated circumferentially (rotational direction), and the heating unit 60 can uniformly heat the fusing belt 43 along the circumferential direction thereof. The fusing belt 43 according to the third embodiment also rotates in a direction reverse to the pressure roller member 32, similarly to during passage of sheet.

(7) Configuration of Fuser According to Fourth Embodiment

Figure 14:
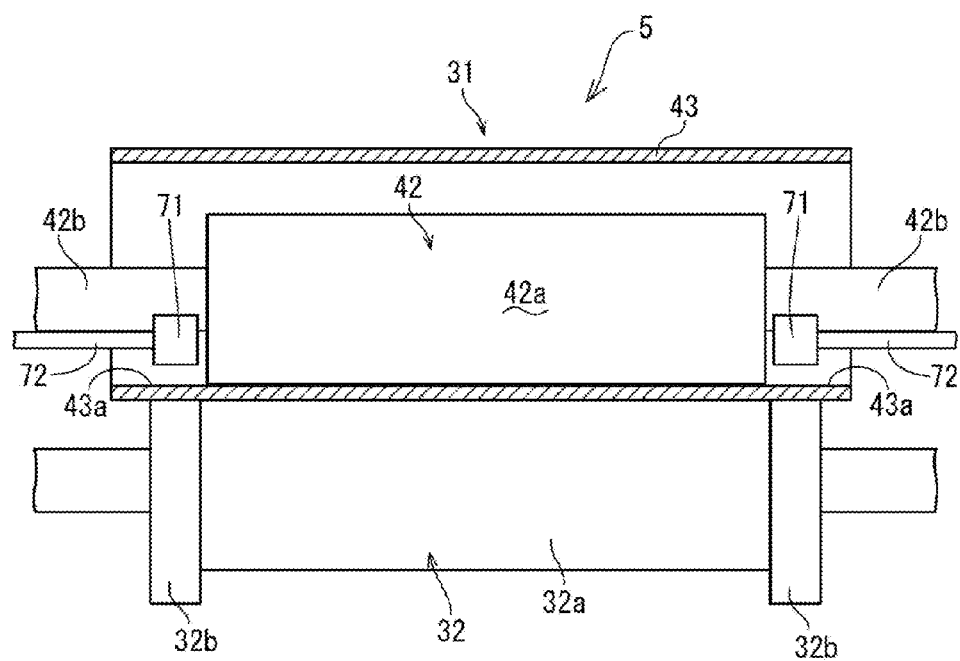
FIG. 14 is an explanatory cross-sectional view illustrating a fuser during passage of sheet according to a fourth embodiment.
Figure 15:
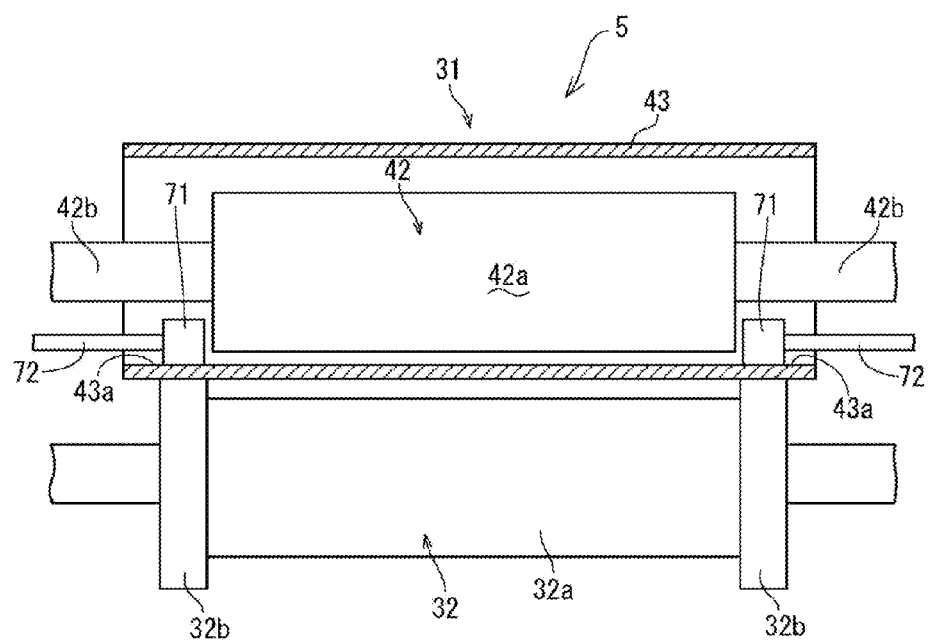
FIG. 15 is an explanatory cross-sectional view illustrating the fuser during non-passage of sheet.

Next, a configuration of a fuser 5 according to a fourth embodiment will be described with reference to FIGS. 14 and 15. The fuser 5 according to the fourth embodiment is also a modification of the second embodiment. In the fourth embodiment, the length of a main body portion 32a of a pressure roller member 32 in a direction of sheet passage width is smaller than that of the second embodiment. Large diameter elastic portions 32b are provided in sheet non-passage areas on both end sides of the pressure roller member 32 in a direction of sheet passage width portions overlapping (hollow end portions 43a of the fusing belt 43). Each of the large diameter elastic portions 32b has a diameter larger than a sheet passage area (main body portion 32a) and is flattened and deformed by pressure-contact of the fusing belt 43.

During passage of sheet in which power of a connection-disconnection motor 57 causes a fusing roller 42 to make pressure-contact with an inner peripheral surface of the fusing belt 43, the fusing roller 42 and the main body portion 32a of the pressure roller member 32 holds the fusing belt 43 therebetween, and a fusing nip 33 is formed. At the same time, both large diameter elastic portions 32b are flattened and deformed by being pressed by the hollow end portions 43a of the fusing belt 43. In such a state, each tension roller 71 is separated from the inner peripheral surface of the fusing belt 43.

Alternatively, during non-passage of sheet in which power of the connection-disconnection motor 57 causes the fusing roller 42 to be separated from the inner peripheral surface of the fusing belt 43, three of the fusing roller 42, the fusing belt 43, and the main body portion 32a of the pressure roller member 32 are completely separated from each other, but each large diameter elastic portion 32b of the pressure roller member 32 is restored to its original form by elastic restoring force thereof, each large diameter elastic portion 32b of the pressure roller member 32 and the corresponding hollow end portion 43a of the fusing belt 43 are maintained in the contact state, and both hollow end portions 43a of the fusing belt 43 are held between a group of the tension rollers 71 and both large diameter elastic portions 32b of the pressure roller member 32.

Accordingly, the fusing belt 43 and each tension roller 71 can be brought into contact with each other with a considerably light force, compared with that during passage of sheet, and a contact surface pressure of each tension roller 71 to the fusing belt 43 can be reduced. Accordingly, wear of the fusing belt 43 is restricted. While the contact surface pressure of each tension roller 71 to the fusing belt 43 is reduced, both hollow end portions 43a of the fusing belt 43 are held between the group of the tension rollers 71 and both large diameter elastic portion 32b of the pressure roller member 32, so that a rotational force of the pressure roller member 32 can be directly transmitted to the fusing belt 43. Accordingly, even during non-passage of sheet, the fusing belt 43 is smoothly rotated circumferentially (rotational direction), and the heating unit 60 can uniformly heat the fusing belt 43 along the circumferential direction thereof. That is, the group of the tension rollers 71, and both large diameter elastic portion 32b of the pressure roller member 32 mainly make contact with the fusing belt 43, during non-passage of sheet. Therefore, even with the configuration according to the fourth embodiment, heat radiation from the fusing belt 43 can be restricted (an effect similar to that of the second embodiment is obtained). The fusing belt 43 according to the fourth embodiment also rotates in a direction reverse to the pressure roller member 32, similarly to during passage of sheet.

(5) Others

The present invention is not limited to the embodiments having been described above, but can be embodied in various modes. For example, the printer has been described as the image forming apparatus, but the invention is not limited to the printer, and a copying machine, a facsimile machine, a multifunction printer having integrated their functions, or the like may be employed. Configurations of component units are not limited to the embodiments having been illustrated, and various modifications can be made without departing from the scope of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A fuser for fixing an unfixed toner image on a recording material, comprising:
    an endless belt body heated by a heat source;
    a pressing body moved to be connected to and disconnected from an inner peripheral surface of the belt body;
    a pressure roller member making pressure-contact with the pressing body through the belt body;
    a tension body moved to be connected to and disconnected from the inner peripheral surface of the belt body, contrary to the connection and disconnection movement of the pressing body; and
    a rotation transmitting unit configured to transmit a rotational force of the pressure roller member to the belt body using the tension body, while the pressing body is separated from and the tension body makes contact with the inner peripheral surface of the belt body.

2. The fuser according to claim 1, wherein the rotation transmitting unit is an auxiliary power transmission belt wound around the pressure roller member and the tension body.

3. The fuser according to claim 1, wherein the rotation transmitting unit is employed to hold the belt body between the pressure roller member and the tension body, while the pressing body is separated from the inner peripheral surface of the belt body.

4. The fuser according to claim 1, wherein the tension body is disposed on an inner peripheral side of a sheet non-passage area on either longitudinal end side of the belt body.

5. The fuser according to claim 1, wherein the tension body has a hardness set lower than the hardness of the belt body.

6. The fuser according to claim 3, further comprising a large diameter elastic portion having a diameter larger than a sheet passage area, and flattened and deformed by pressure-contact of the belt body, in a sheet non-passage area on either longitudinal end side of the pressure roller member, wherein the tension body is disposed on an inner peripheral side of the sheet non-passage area on either longitudinal end side of the belt body, and the belt body is held between the large diameter elastic portion and the tension body while the pressing body is separated from the inner peripheral surface of the belt body.

7. The fuser according to claim 1, wherein the belt body includes a magnetic metal layer, and the heat source is an induction heating member configured to heat the magnetic metal layer of the belt body by electromagnetic induction effect.

8. The fuser according to claim 1, wherein the tension body makes contact with the inner peripheral surface of the belt body, supports the belt body without contact with the pressing body and the pressure roller member, and rotates itself in association with the rotation of the pressure roller member to transmit the rotational force of the pressure roller member to the belt body.

9. An image forming apparatus comprising the fuser according claim 1.

* * * * *